Sept. 22, 1931.  H. H. STEINMAN  1,824,751
ANTIFROST SHIELD
Filed Aug. 9, 1929

Inventor
Harry H. Steinman
By A. P. Johnson
Attorney

Patented Sept. 22, 1931

1,824,751

UNITED STATES PATENT OFFICE

HARRY H. STEINMAN, OF ST. PAUL, MINNESOTA, ASSIGNOR TO NO FROST CLEAR VISION SHIELD COMPANY, INC., A CORPORATION OF MINNESOTA

ANTIFROST SHIELD

Application filed August 9, 1929. Serial No. 384,643.

The present invention relates to an automobile anti-frost shield. In driving a closed automobile in winter, the humidity within the car is increased by the breathing of the occupants of the car, and the inner sides of the windows of the car are frequently covered with frost, due to the fact that the windows are exposed on their outer surface to the cold outer air which chills the window pane and condenses the moisture within the car in the form of frost on the inner surfaces of the wind shield and windows of the automobile. This formation of frost on the inner sides of the windows greatly decreases the vision of the driver and constitutes not only a very serious annoyance but also a considerable menace to cold weather driving. It has been found that the placing of a sheet of celluloid over the window so as to space the sheet of celluloid from the window, affords a very effectual remedy for this condition.

An object of the present invention is to form a sheet of celluloid so that it may be adhesively secured to an automobile window closure and to so form this sheet that the major portion thereof will be spaced outwardly from the glass of the window closure so as to provide an air space between the window and the frost shield.

In order to attain this object there is provided, in accordance with one feature of the invention, a sheet of celluloid having a plurality of depressions therein about the outer edge thereof, the depressed portions resting upon the window surface to hold the remaining main body of the device outwardly in spaced relation from the glass of the window surface. Adhesive strips are provided which surround the entire frost shield and are adhesively secured to the window glass and to the edges of the frost shield to firmly hold the device in position thereon. These and other features of the invention will be more fully brought out in the following description and the accompanying drawings wherein;

Figure 1:
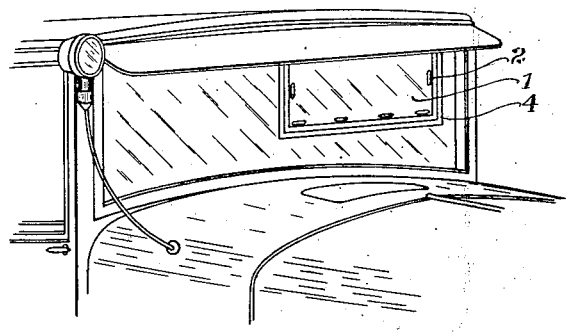
Figure 1 is a view in perspective of an automobile wind shield with a frost shield made in accordance with the present invention secured to the inner side thereof.
Figure 2:
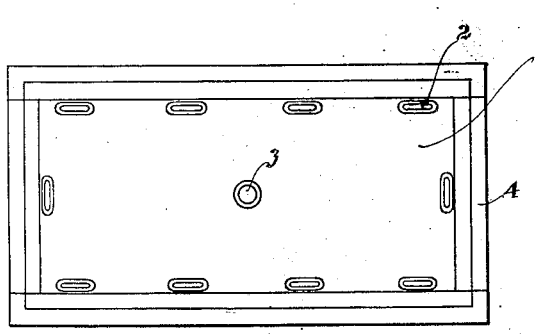
Figure 2 is a view of a shield made in accordance with the present invention with strips of adhesive material secured about the edges thereof.
Figure 3:
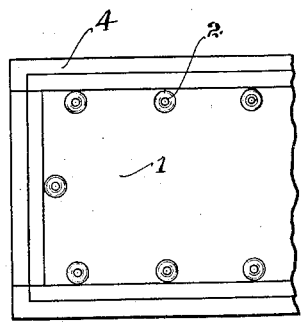
Figure 3 is a view similar to Figure 2 of a portion of a frost shield with a different type of depression therein.
Figure 4:
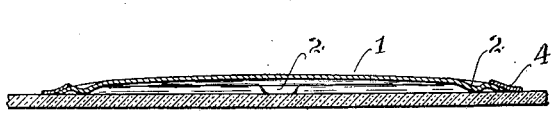
Figure 4 is a sectional view on line 4—4 of Figure 2.
Figure 5:
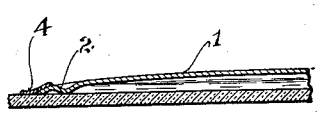
Figure 5 is a sectional view on line 5—5 of the Figure 3.
Figure 6:
Figure 6 is an edge view of the device shown in Figures 2 and 4.

Referring to the drawings in detail, a sheet of celluloid 1 is cut to a desired shape and a plurality of depressions 2 are made around the edge of said sheet and spaced inwardly from said edge. These depressions may be oval as shown in Figure 2 or may be circular or any other desired shape as shown in Figure 3. In a small shield the entire central area of the celluloid shield may be left clear, but in a larger shield it has been found desirable to form a depression or plurality of depressions in the central portion of the shield as at 3 in Figure 2.

With each shield when sold is supplied a quantity of adhesive tape 4 sufficient to cover the entire exterior edge of the shield to securely mount the shield on a sheet of glass. This tape may be secured to the shield before packing or may be supplied as a separate unit. The device is also useful for affixing to a window such as a store window to provide a clear area therein where the remainder of the window is apt to become frosted.

By making a plurality of shields with the depressions of the same shape and in the same locations a plurality of the shields may be readily packed, the depressions of successive shields fitting into each other in order to permit a large number of the sheets to be packed together in a small area.

I claim:

1. An anti-frost shield formed of a transparent, planiform flexible sheet having a plurality of indentations spaced inwardly from the edges thereof to hold the central portion of said sheet in spaced relation from a window glass on which it is mounted, and an adhesive strip connected about the edges of said flexible sheet to extent beyond said edges and adapted to fasten to a plate of glass on which the device is mounted, the adhesive strip drawing the edges of said sheet downwardly to distort the sheet from its normal planiform shape.

2. An anti-frost shield formed of a transparent, planiform, flexible sheet having a plurality of indentations spaced inwardly from the edges thereof, one of said indentations being substantially centrally of said sheet, to hold the central portion of said sheet in spaced relation from a window glass on which it is mounted, and an adhesive strip connected about the edges of said flexible sheet to extend beyond said edges and adapted to fasten to a plate of glass on which the device is mounted, the adhesive strip drawing the edges of said sheet downwardly to distort the sheet from its normal, planiform shape.

In testimony whereof I affix my signature.

HARRY H. STEINMAN.